United States Patent
Wang

(10) Patent No.: US 8,219,672 B2
(45) Date of Patent: Jul. 10, 2012

(54) METHOD AND APPARATUS FOR DISTRIBUTED BACKUP OF COMPUTER DATA

(76) Inventor: Yu Wang, Edison, NJ (US)

(*) Notice: Subject to any disclaimer, the term of this patent is extended or adjusted under 35 U.S.C. 154(b) by 503 days.

(21) Appl. No.: 12/391,492

(22) Filed: Feb. 24, 2009

(65) Prior Publication Data
US 2010/0217792 A1    Aug. 26, 2010

(51) Int. Cl.
*G06F 15/173*    (2006.01)
*G06F 11/00*    (2006.01)

(52) U.S. Cl. .................... 709/224; 709/223; 714/4.1

(58) Field of Classification Search ............... 709/223, 709/224, 226; 714/4, 4.1
See application file for complete search history.

(56) References Cited

U.S. PATENT DOCUMENTS

| | | | |
|---|---|---|---|
| 6,195,680 B1* | 2/2001 | Goldszmidt et al. | 709/203 |
| 6,560,617 B1* | 5/2003 | Winger et al. | 707/610 |
| 6,609,213 B1* | 8/2003 | Nguyen et al. | 714/4 |
| 6,948,021 B2* | 9/2005 | Derrico et al. | 710/302 |
| 7,409,420 B2* | 8/2008 | Pullara et al. | 709/203 |
| 7,661,019 B2* | 2/2010 | Fujibayashi | 714/6 |
| 2004/0024861 A1* | 2/2004 | Coughlin | 709/224 |
| 2004/0153749 A1* | 8/2004 | Schwarm et al. | 714/11 |
| 2008/0184063 A1* | 7/2008 | Abdulvahid | 714/6 |

* cited by examiner

*Primary Examiner* — Brian J Gillis
(74) *Attorney, Agent, or Firm* — Walter J. Tencza, Jr.

(57) ABSTRACT

A data server computer ring including first and second data server computers, and any number of further data server computers. The data server computer "ring" can include any configuration in which the data server computers are connected together by communications links. The first and second data server computers are programmed by a computer program so that when one of the first and second data server computers is not operating, so that it is a non operating data server computer, the other of the first and second data server computers takes over one or more functions normally performed by the non operating data server computer.

15 Claims, 6 Drawing Sheets

METHOD AND APPARATUS FOR DISTRIBUTED BACKUP OF COMPUTER DATA

FIELD OF THE INVENTION

This invention relates to improved methods and apparatus concerning backup of computer or electronic data.

BACKGROUND OF THE INVENTION

There are various devices and/or methods known in the prior art for backing up computer data.

SUMMARY OF THE INVENTION

At least one embodiment of the present invention provides an apparatus comprising a data server computer ring. The data server computer ring may include a first and second data server computers, and any number of further data server computers. The data server "ring" can include any configuration in which the data server computers are connected together by communications links. The data server ring is not limited to a "ring" shape, for example. The data server "ring" may also be referred to as a data server "group".

In at least one embodiment, each of the first and second data server computers are programmed by a computer program so that when one of the first and second data server computers is not operating, so that it is a non operating data server computer, the other of the first and second data server computers takes over one or more functions normally performed by the non operating data server computer. The one or more functions normally performed by the non operating data server computer include a backup of data function or a restore of data function. Both of the first and second data server computers may be configured to communicate with a plurality of data agent computers.

In at least one embodiment, a user computer is programmed by a user interface computer software program which allows a user operating the user computer to control parameters related to the first and second data server computers. A directly attached computer storage device may be connected by a communications link to the first data server but not the second data server. A network computer storage device may be connected by a communications link to the first data server and the second data server.

At least one embodiment of the present invention also includes a method comprising the steps of configuring a first data server computer and a second data server computer in a data server ring. The step of configuring may includes connecting the first data server computer and the second data server computer by a communications link. The method may further include programming each of the first and second data server computers by a computer program so that when one of the first and second data server computers is not operating, so that it is a non operating data server computer, the other of the first and second data server computers takes over one or more functions normally performed by the non operating data server computer.

DETAILED DESCRIPTION OF THE DRAWINGS

Figure 1:
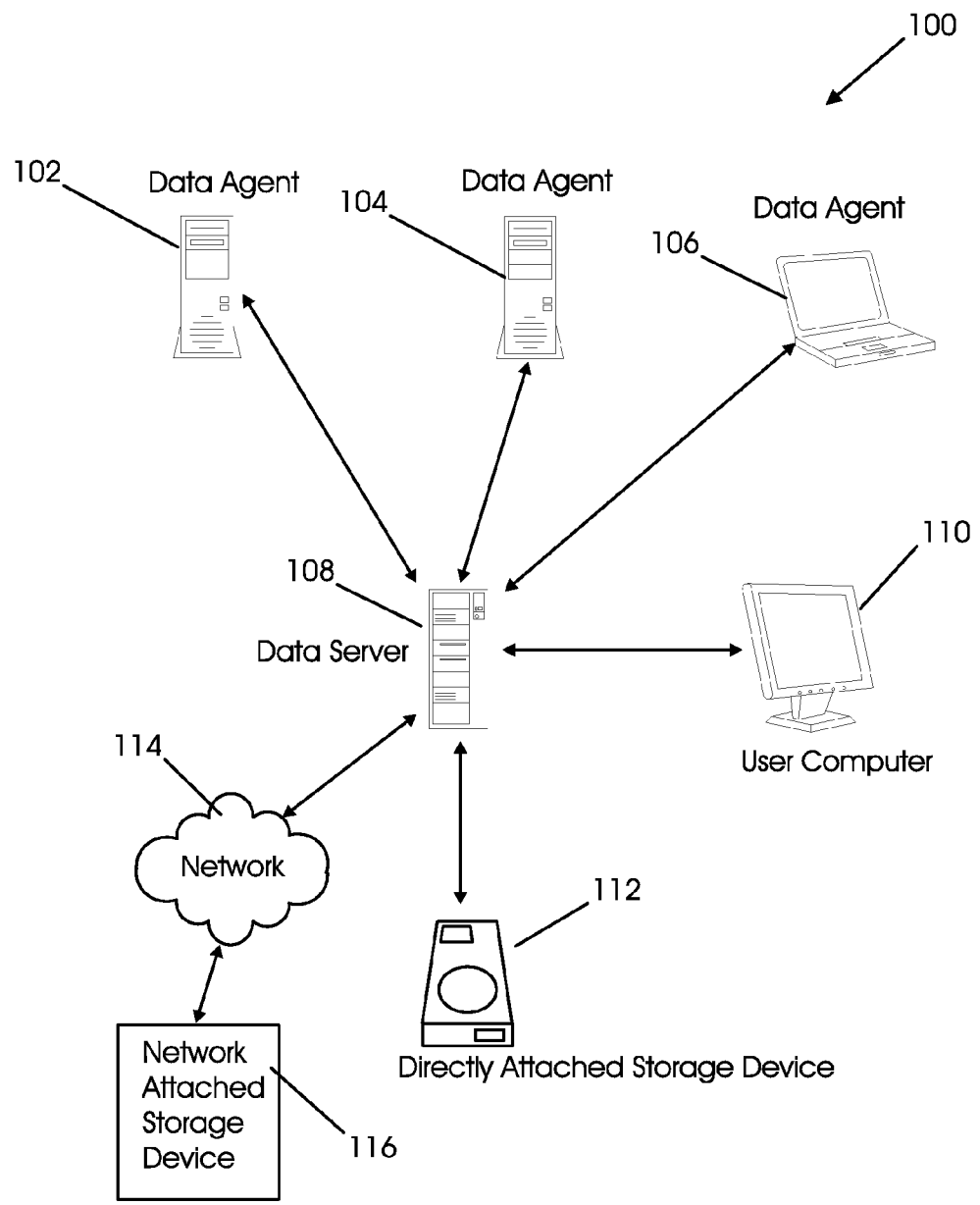
FIG. 1 shows a diagram of a prior art apparatus.

FIG. 1 shows a diagram of a prior art apparatus 100. The prior art apparatus 100 includes data agents 102, 104, and 106, data server 108, user computer 110, directly attached storage device 112, network 114, and network attached storage device 116. Each of the data agents 102, 104, and 106, and the data server 108, may include a computer having a computer memory, one or more computer processor(s), a computer monitor, and an interactive device such as a computer mouse and/or computer keyboard. The user computer 110 may also include a computer having a computer memory, a computer processor, a computer monitor, and an interactive device such as a computer mouse and/or computer keyboard. The directly attached storage device 112 may be a computer storage device or computer memory which is accessible to the data server 108 via any known communications links. The network 114 may be a computer network, such as the internet or any other computer network. The network attached storage device 116 may be a computer storage device or computer memory which is accessible via the network 114.

The data agents 102, 104, and 106, the user computer 110, and the directly attached storage device 112 communicate with the data server 108 via communications links which may be hardwired or wireless, optical, electronic, or any combination of known communications links.

The prior art of FIG. 1 has a plurality of data agents (102, 104, and 106, which can also be called backup agents) that connect to a single data server 108. In the prior art the plurality of data agents or backup agents (102, 104, and 106) may manage a backup and restore data process for themselves, however, the single data server 108 may or may not provide data storage as well. In the prior art, the single data server 108 may implement a cluster. In the present application, a "cluster" is a computer software implementation that runs two or more computer operating systems and/or computer software applications on one single physical computer. Each of the two or more computer operating systems and/or computer software applications is called a node, and typically only one node can be active at a time in a "cluster" configuration. In a "cluster" configuration, if an active node is down, the other node will become active, thus provide a failover capability, but note, that a "cluster" is a computer software implementation on a single physical box or single physical computer. Thus, if the entire physical box (or computer) is dead due to hardware failure, etc, none of the nodes in the cluster can be active at all.

At a given time, only one instance of server or one node of a "cluster" is running on the data server 108 to provide services for data or backup agents 102, 104, and 106. In the prior art, if the data server 108 is dead or performance deteriorated, data agents 102, 104, and 106 will not run or will have deteriorated performance, since their performance is effectively pooled. The communication of data agents 102, 104, and 106 to the data server 108 over communications links will become slow (due to the data server 108 being slow), and thus the performance of the overall system or apparatus 100 will suffer.

Figure 2:
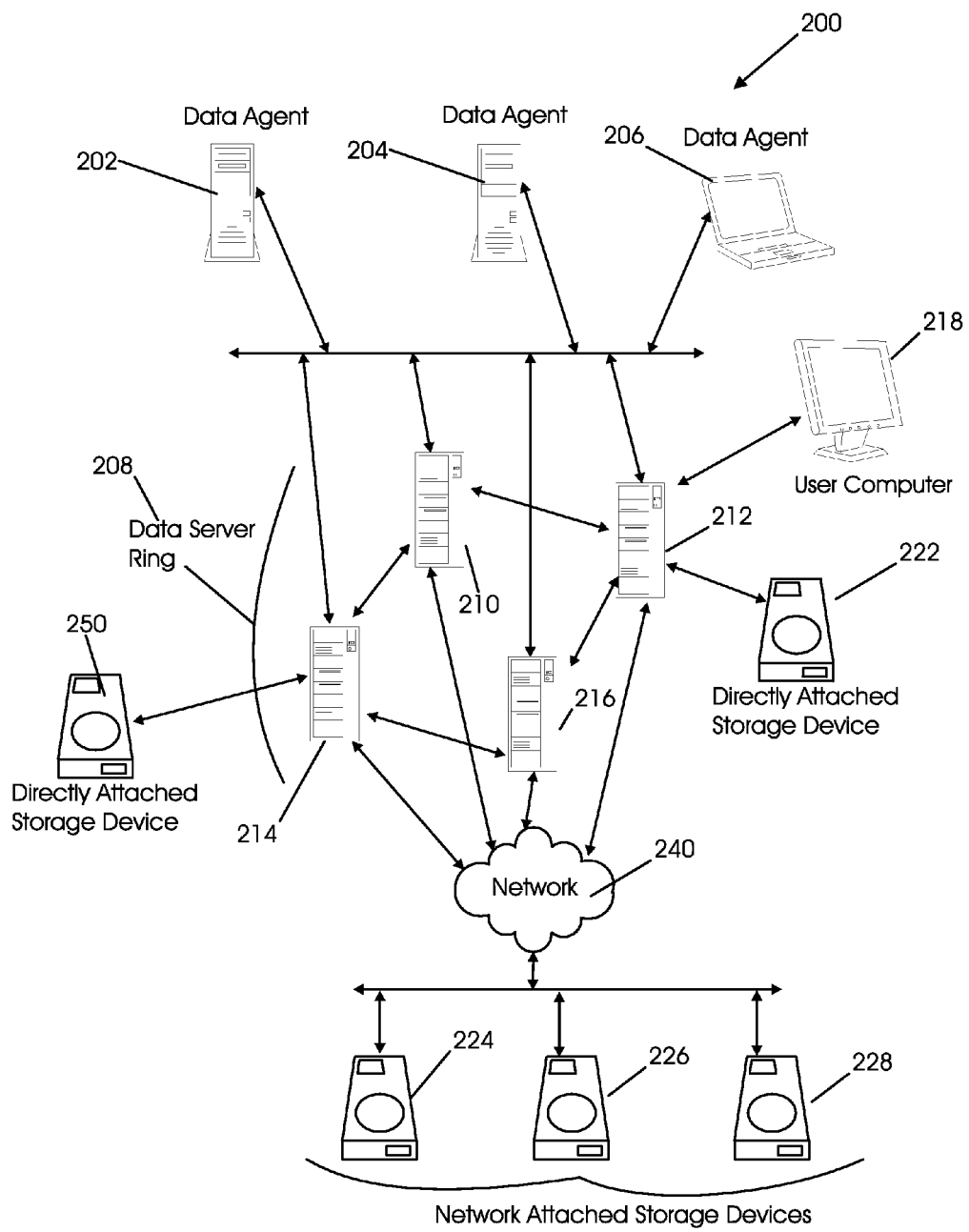
FIG. 2 shows a diagram of an apparatus for use in accordance with an embodiment of the present invention.

FIG. 2 shows a diagram of an apparatus 200 for use in accordance with an embodiment of the present invention. The apparatus 200 includes data agents 202, 204, and 206, a data server ring 208, and a user computer 218. The data server ring 208 may also be referred to as a data server "group". The apparatus 200 may also include directly attached storage devices 250 and 222 which communicate with the data servers 214 and 212, respectively, via communications links. The apparatus 200 may include a network 240 (such as the internet) and network attached storage devices 224, 226, and 228, which communicate with the network 240 via communications links.

The network attached data storage devices, such as 224, 226, and 228, shown in FIG. 2, can be accessed via the network 240 by any of the data servers 210, 212, 214, and 216 of the data server ring 208. Each of the network attached storage devices (each of 224, 226, and 228) or the directly attached storage devices (each of 222 and 250) can be computer disks, computer tape library storage devices, virtual tape library storage devices, or other types of computer storage or computer memory devices. In the FIG. 2 embodiment, each data server in the data server ring 208 (each of data servers 210, 212, 214, and 216) can also have one or more directly attached storage devices. For example, data server 214 is shown directly attached to directly attached storage device 250, which may be a computer memory, such as a computer memory disk or tape. Also data server 212 is shown directly attached to directly attached storage device 222. Each of the data servers in data server ring 208 (each of data servers 210, 212, 214, and 216) may also have access to networked storage devices or network attached devices 224, 226, and 228 through network 240.

The data server ring 208 may be comprised of a plurality of data servers, such as data servers 210, 212, 214, and 216, and any number of further data servers.

Each of the data agents 202, 204, and 206, and each of the data servers (each of 210, 212, 214, and 216) of the data server ring 208, may include a computer having a computer memory, one or more computer processor, a computer monitor, and an interactive device such as a computer mouse and/or computer keyboard. The computer monitor or user computer 218 may also include a computer having a computer memory, one or more computer processors, a computer monitor, and an interactive device such as a computer mouse and/or computer keyboard.

The FIG. 2 apparatus 200 of an embodiment of the present invention, in contrast to the FIG. 1 prior art apparatus, has multiple data servers (210, 212, 214, and 216) that are chained together in a data server ring 208. The data agents (also called backup agents) 202, 204, and 206 are linked by communications links to the data server ring 208, and thus have access to all data servers (including 210, 212, 214, and 216) in the data server ring 208. Each of the data agents 202, 204, and 206 is linked by communications links to each of the data servers 210, 212, 214, and 216 of the data server ring 208. In addition, a user, using a user interface computer program running on user computer 218 can configure which data server or data servers in a ring, such as 208, that a data agent (of 202, 204, and 206) can be used for a backup or restore task. If one data server is dead (such as one of 210, 212, 214, or 216) or performance deteriorated, the data or backup agents (202, 204, or 206) can switch to other healthy data server(s) (one or more of 210, 212, 214, or 216, whichever is still working or has not died) without any down time or lower performance.

The data server ring 208 provides a distributed model so that each data server of the ring 208 can provide data protection and recovery. The data servers in the ring 208 are chained in a ring to sync up meta data. If one of the data servers, such as one of 210, 212, 214, and 216 of ring 208 are down, the down data server is skipped by a synchronization (sync up) process. Each data server (of 210, 212, 214, and 216), which is not down, will send out its own sync up message to all data servers known to itself (in this case, assuming data server 212 is not down, it would send a sync up message to data server 210, 214, and 216). Each data server (of 210, 212, 214, and 216) that is not down, is programmed by a computer program to process sync up messages received from other data servers (for example, assuming data server 212 is not down, it is programmed to receive and process sync up messages from all other data servers of 210, 214, and 216, which are not down).

If, for example, data server 212, does not receive a sync up message from data server 210, then the data server 212 is programmed by a computer program to detect that the data server 210 is down or unreachable. Data server 212 is programmed by a computer program to then update its own meta data located and/or stored in computer memory of the data server 212 to indicate that the data server 210 is down. Data servers 214 and 216 are likewise programmed by a computer program to update their own meta data, located and/or stored in their respective computer memory, to indicate that the data server 210 is down.

The data agents 202, 204, and 206 are programmed by a computer program to then not pick the down data server (in this example data server 210) for backup and restore operation. When the data server (in this example data server 210) is no longer down, i.e. comes back online, the previously down data server (in this example data server 210) is programmed by a computer program to send out a sync up message to the other data servers (in this example data servers 212, 214, and 216). Thus the data server 210 will be put back into the sync up process, to join sync up when the previously down data server (210 in this example) comes back online. In one embodiment of the present invention, metadata of the other data servers in the data server ring 208, can be used to reconstruct metadata of a corrupted data server in the ring 208. For example, if data server 210 is corrupted, then the data server 210 is programmed by a computer program to receive metadata from the other data servers (data servers 212, 214, and 216) in the ring 208 which are used in one embodiment to reconstruct metadata. If a data server (such as in this example 210) comes back online, the results of a sync up process will recover all configuration data for the previously down data server (in this example data server 210) and thus achieve the reconstruction of the meta data on the previously down data server (in this example data server 210).

Each of the one or more data servers such as 210, 212, 214, and 216 have their own meta data, which generally is data about other data, and which may include data concerning the particular data server configuration, the data agents (such as one or more of 202, 204, and 206) which use this particular data server (such as one of 210, 212, 214, and 216), and data concerning the data storage devices (such as directly attached storage devices 222 or 250) that the particular data server can access.

In accordance with at least one embodiment of the present invention, the data servers (such as 210, 212, 214, and 216) are aware of the presence of each other. This is achieved by attaching a data server (such as one of 210, 212, 214, and 216) into the data server ring 208. "Attaching" a data server can be done, in one embodiment, by notifying all other data servers in the ring 208 that a new data server is now going to be looped in the ring 208 by sending a network message to the other data server or data servers (such as one or more of 210, 212, 214, and 216), in accordance with an embodiment of the present invention, based on a particular data server's meta data. Each data server (of 210, 212, 214, and 216) may be programmed by a computer program to send a network message to each of the other data servers (of 210, 212, 214, and 216).

A particular data server's meta data may be stored in a directly attached storage device (for example, for data server 214, directly attached storage device 250 can be used) or in a network attached storage device of network attached storage devices 224, 226, and 228. Each of the directly attached storage devices (such as 222 or 250 or similar directly attached storage devices for data server 210 and 216 which are not shown) and each of the network attached storage devices 224, 226, and 228 may be any kind of computer storage device, such as a computer storage array.

A computer program running on a particular data server may provide a data base. In the case of using a computer program which provides a database, the place where the meta data is stored may be governed by the particular computer application program which runs or provides the data base. The data base system or computer program for providing the data base can be Microsoft (trademarked) sql server, mysql (trademarked by Sun Microsystems), Oracle (trademarked), "db2" (database product, trademarked by IBM), and other data base systems or computer programs. Each data base system or computer program providing a data base, provides a way to configure where the data is stored.

The data servers in the ring 208 can operate in two modes, distributed and central. Central mode means all data servers (such as 210, 212, 214, and 216) in a ring (such as 208) use the same copy of meta data, that is the meta data contains all configurations for all data servers (such as 210, 212, 214, and 216) in the ring (such as 208). This copy of meta data is in a data storage device or devices (such as one of network attached storage devices 224, 226, and 228) that all data servers (such as 210, 212, 214, and 216) have access to. In at least one embodiment of the present invention, the storage of meta data is different and separated from storage for data of a data agent (such as one of data agents 202, 204, and 206).

In distributed mode, each data server in the ring 208 has its own meta data in a data store or data storage device (such as directly attached storage device 222 for data server 212). This data storage device or devices (such as directly attached storage device 222) may contain configuration data about other data servers in the ring 208 through a process called data server sync or synchronization in accordance with an embodiment of the present invention. Data server sync or synchronization happens in a ring, such as 208, when each data server (such as each of 210, 212, 214, and 216) sends its own meta data to the other data server or data servers (such as the others of 210, 212, 214, and 216). Also each data server, is programmed by a computer program to receive meta data from other data servers (such as others of 210, 212, 214, and 216).

In accordance with an embodiment of the present invention, meta data sent in a data server sync message will contain all configuration parameters pertaining to the initialization of a sending or transmitting data server. A particular data server may be programmed by a computer program to send out subsequent sync messages only when there is a change in configuration parameters for the sending/transmitting data server. The changes are typically defined, in one embodiment, as changed (new, deleted, updated) meta data pertaining to the transmitting data server (such as one of data servers 210, 212, 214, and 216).

A data server (such as one of 210, 212, 214, and 216) can be taken out of ring (such as 208) by a "detachment" process. "Detachment" will logically remove the data server (such as one of 210, 212, 214, and 216) from the ring, such as 208. Following detachment, the detached data server will not participate in the sync process any more. However, detaching one data server (such as one of 210, 212, 214, and 216) will have no impact on functionality of the ring (such as 208) provided that other data servers are still attached in the ring.

In at least one embodiment of the present invention, the apparatus 200 is configured and/or programmed by one or more computer programs so that adding or removing a data server from the data server ring 208 will have no impact on the data server ring 208, but will achieve better performance, better scalability and better capacity. A new data server ring in addition to the data server ring 208 can be built and linked to an existing one(s).

In one or more embodiments of the present invention, each of a plurality of data agents, such as 202, 204, and 206, is programmed by a computer program to transmit data to one or more data servers (such as data servers 210, 212, 214, and 216). Each of the one or more data servers (of data servers 210, 212, 214, and 216) is programmed by a computer program to store the data on storage devices (such as one or more directly attached storage devices 222, 250 or directly attached storage devices attached to data server 210, and 216 not shown), or one or more network attached storage devices (such as one or more of network attached storage devices 224, 226, and 228).

In at least one embodiment of the present invention, data load is substantially balanced among data servers of the data server ring 208. A backup/restore computer program runs on each data agent of the data agents 202, 204, and 206. At the time of backup of data for each of the data agents 202, 204, and 206, a backup/restore computer program for the particular data agent (one of 202, 204, and 206) examines available data servers in the ring 208, chooses one or more data servers (of data servers 210, 212, 214, and 216), and typically transmits data to one or more data servers 210, 212, 214, and 216 simultaneously.

If a particular data server, such as data server 210, is already overloaded with data, current data from a data agent, such as data agent 202, which needs to be backed up, will not be sent to data server 210 for backup, but rather will be routed to the data servers 212, 214, and 216 (assuming they are also not overloaded with data for data backups or otherwise). The load on each data server (of data servers 210, 212, 214, and 216) is defined by the amount of data currently coming into a particular data server (of 210, 212, 214, and 216) and throughput on each data server (size of data transferred per unit of time). Each data server (of 210, 212, 214, and 216) records a count of the amount of data in that data server's meta data stored in that data server's computer memory. A computer software program running on each data agent (of data agents 202, 204, and 206) retrieves the meta data from all of the data servers (210, 212, 214, and 216) or a set of data servers in the ring 208 before the particular data agent (of data agents 202, 204, and 206) starts transmitting data. A meta data retrieval computer program running one each data agent (of 202, 204, and 206) may choose one or more data servers (of data servers 210, 212, 214, and 216) with a least amount of time for running a task. However, a user can also appoint the data server(s) (of data servers 210, 212, 214, and 216) that a particular data agent (of data agents 202, 204, and 206) can use, and in such a case, load balancing still occurs, but only among these appointed data servers.

Figure 5:
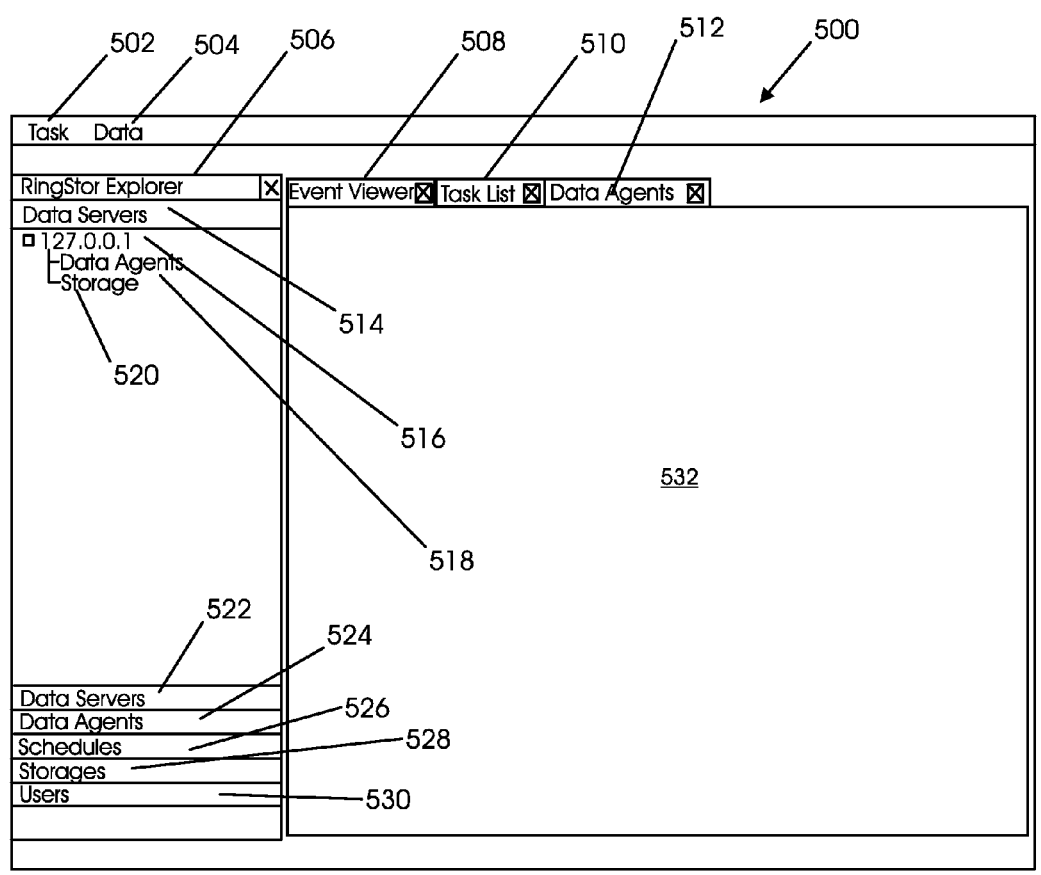
FIG. 5 shows a diagram of a screen shot or image which can be displayed on a computer monitor of a user computer of the apparatus of FIG. 3, in accordance with an embodiment of the present invention.

In at least one embodiment of the present invention, a window desktop graphical user interface (GUI) is used, such as shown in FIG. 5. FIG. 5 shows a diagram of a screen shot or image 500 which can be displayed on a computer monitor of user computer 218 of FIG. 2 or user computer 324 of FIG. 3 in accordance with an embodiment of the present invention. The screen shot or image 500 can be considered to be a graphical user interface (GUI) or part of a GUI, which can be used to control data server rings 208 show in FIG. 2 or 308 or 340 shown in FIG. 3, and/or one or more further data server rings.

The image 500 includes fields 502, 504, 506, 508, 510, 512, 514, 516, 518, 520, 522, 524, 526, 528, and 530. Each of the fields 502-530 can be clicked on using a computer cursor and a computer mouse of user computer 218 of FIG. 2 or user computer 324 of FIG. 3 to cause a computer program running on either user computer 218 or user computer 324 to execute various instructions. The field 502 identified as "Task" can be clicked on to cause a "Task" menu to be displayed. On this Task menu (not shown), one or more sub menus may be displayed in one embodiment, for example a sub menu "Schedule A New Task" may be displayed which will allow a user to schedule various tasks (implemented by a computer program) to run on a Data Agent (such as one of data agents 202, 204, and 206) or a Data Server (such as one of data servers 210, 212, 214, and 216), such as a backup task or a restore task. The field 504 identified as "Data" can be clicked on to cause a "Data" menu (not shown) to be displayed. On this Data menu, one or more sub menus, in one embodiment, may be displayed, for example sub menu "Create A New Data Set" will allow a user to create a data set which contains data to be backed up on a data agent.

The field 506 for "Ring Stor Explorer" includes several explorers that show all entities in a ring configuration. The field 506 includes a field 522 for Data Servers explorer (shown as "Data Servers"), a field 524 for Data Agent explorer (shown as "Data Agents"), field 526 for Schedules Explorer (shown as "Schedules"), field 528 for Storages explorer (shows as "Storages"), and field 530 for Users explorer (shown as "Users"). Field 514 shows a current explorer which has been selected. In this case the Data Servers explorer (i.e. select field 522 to make Data Servers explorer active and put "Data Servers" in field 514 near top of image 500 in FIG. 5.

Each explorer will show its relevant entities in a logic tree structure, for example, the left side of FIG. 5 shows a Data Server Explorer which displays current Data Servers in the ring of data servers, such as ring 208. In this case, the current data servers include one data server labeled 127.0.0.1 shown by field 516, and it shows a set of Data Agents configured to use this Data Server (127.0.0.1) for backup or restore. In at least one embodiment of the present invention, a data agent, such as data agent 202 can access all data servers in a ring, such as ring 208, but a user, through user computer 218 and through a user interface, including image 500, can limit a data agent's (such as data agent 202's) access to only a subset of data servers in the ring, such as ring 208. The Data Agents tab or field 512 shown in FIG. 5, when clicked on with a computer cursor using a computer mouse, will display current data servers that this data agent (such as data agent 202 or 127.0.0.1) can use for various tasks. Storage devices (such as computer storage devices) are shown by field 520 in FIG. 5.

Depending on the selection in each explorer of the Ring Stor Explorers (Data Server Explorer, Data Agent Explorer, etc.), the field 532 will display relevant information related to that explorer. For example, if Data Server Explorer's Data Agents is clicked (by first clicking field 522, then field 516, then field 518), the field 532 will display all Data Agents that are configured to use the selected Data Server (in FIG. 5, DataServer is 127.0.0.1) for a backup and restore processor implemented by a computer program. Field 532 also has two tabs or fields 508 and 510 that show current events and running tasks, respectively, inside a data server ring, such as 208. Clicking on field or tab 508 "Event Viewer" causes all current events for the ring, such as 208, to be displayed on a computer monitor of a user computer, such as user computer 218. Examples of events can be "Data Server # is attached" (with "#" standing for an identification code for a particular data server of data servers 210, 212, 214, and 216, for example, by a code, such as 127.0.0.1), "DataAgent ## goes online (with "##" standing for a particular data agent of data agents 202, 204, and 206 for example, such as by a code), or other events. Clicking on field or tab 510 "Task List" causes a list of running tasks for the data server ring 208 to be displayed, for example, a backup task, a restore task, and clicking on field or tab 512 "Data Agents" causes a display of all Data Agents (or codes referring to all data agents) that are configured to the selected Data Server in the Data Server Explorer on the left side, in field 514 or 522 shown in FIG. 5, The GUI, such as including image or screen 500 and a computer software program which causes the display of screen 500 and the interpretation of selections of fields in the screen 500, can be used to manage all aspects of the system. For example, a user can use the GUI or screen 500 to attach or detach a data server (such as one of data servers 210, 212, 214, and 216), configure an additional storage device into the system or apparatus 200, or schedule a backup/restore task for a data agent (such as one of data agents 202, 204, and 206), etc. This can be done by clicking on the "Task" field 502 in FIG. 5 to causes a submenu to be displayed right under "Task" field 502. The user can then click on a field for "Create A New Task" (not shown) to schedule a task for a data agent such as one of data agents 202, 204, and 206. In at least one embodiment, the GUI or computer software related to the production of at least the screen 500, can be downloaded or installed from a disk or from the internet or world wide web onto the user computer 218 or 324. After downloading, the GUI computer program can be run on the user computer 218 or 324. The GUI computer software program may require a user to provide username/password, the name or identification code of a particular data server ring or data server to log into, such as data server ring 208 in FIG. 2. In some embodiments a GUI web interface is not encouraged due to its lack of maintaining states, security and in general the difficulty of being an interactive interface.

The connection between the data server ring 208 and the data agents 202, 204, and 206 can be via public network, or LAN or any known communication links.

A computer processor of the user computer 218 may run user interface computer software that can be used to connect the user computer 218 to a data server (such as one of 210, 212, 214, and 216) in the ring 208. The interface computer software on the user computer 218 or 324 can be used to view on a computer monitor of the user computer 218 and/or manage through the user computer 218 all aspects in the ring 208, including manage all data agents (such as one or more of 202, 204, and 206), data servers (one or more of 210, 212, 214, and 216), data storage devices (such as 222, 250, 224, 226, and 228) or other configurations in the data ring 208.

Data agents (such as 202, 204, and 206) are configured, such as by being programmed by computer software to connect and/or communicate by communications links to the data server ring 208, and thus have access to all data servers (210, 212, 214, and 216) in the data server ring 208. In one embodiment, data agents 202, 204, and 206 can backup data to or restore data from any available data servers of 210, 212, 214, and 216. In contrast, in the prior art, such as shown in FIG. 1, one data agent or backup agent goes to one physical machine (data server 108) for backup or restore. In one or more embodiments of the present invention a data agent, such as one of 202, 204, and 206 may concurrently use multiple data servers (210, 212, 214, and 216) for such operation. What data server or data servers (of 210, 212, 214, and 216) to use for a data agent (such as one of 202, 204, and 206) is configurable via user interface programmed by computer software into user computer 218 and accessible via user computer 218.

The architecture of FIG. 2, particularly of the data server ring 208, supports "real time" growth, if more data agents are configured to use the data server ring 208, more data servers can be added into the ring 208 without shutting down all the data servers in the ring 208. A new data server can be added to the ring 208 via an "attachment" process previously described. The architecture of the data server ring 208 also supports "real time" shrink, i.e. that a data server (such as one of 210, 212, 214, and 216) can be detached from the data server ring 208 without shutting down other data servers in the ring 208.

Two or more data server rings, similar to data server ring 208, except typically with different data servers, can be configured if needed. In one embodiment of the present invention each data server ring of a plurality of data server rings may function as stated above for data server ring 208. The plurality of data server rings, may have a communications link between them. For example a data server, such as data server 210 in data server ring 208, may be connected by a communications link, not shown, to a data server in second data server ring. Each data server, such as 210, 212, 214, and 216, and data servers in a second data server ring, may send ring configuration data to each other. The ring configuration is the aggregate of each data server's configuration in the ring. The configuration for the ring 208 includes meta data from each data server (of data servers 210, 212, 214, and 216) in the ring 208. The data server ring 208 can be configured and linked to other data server rings with out shutting down other rings. A user, through a user interface programmed by computer software into user computer 218, can keep track of parameters in one data server ring, such as 208, or multiple data server rings.

Figure 3:
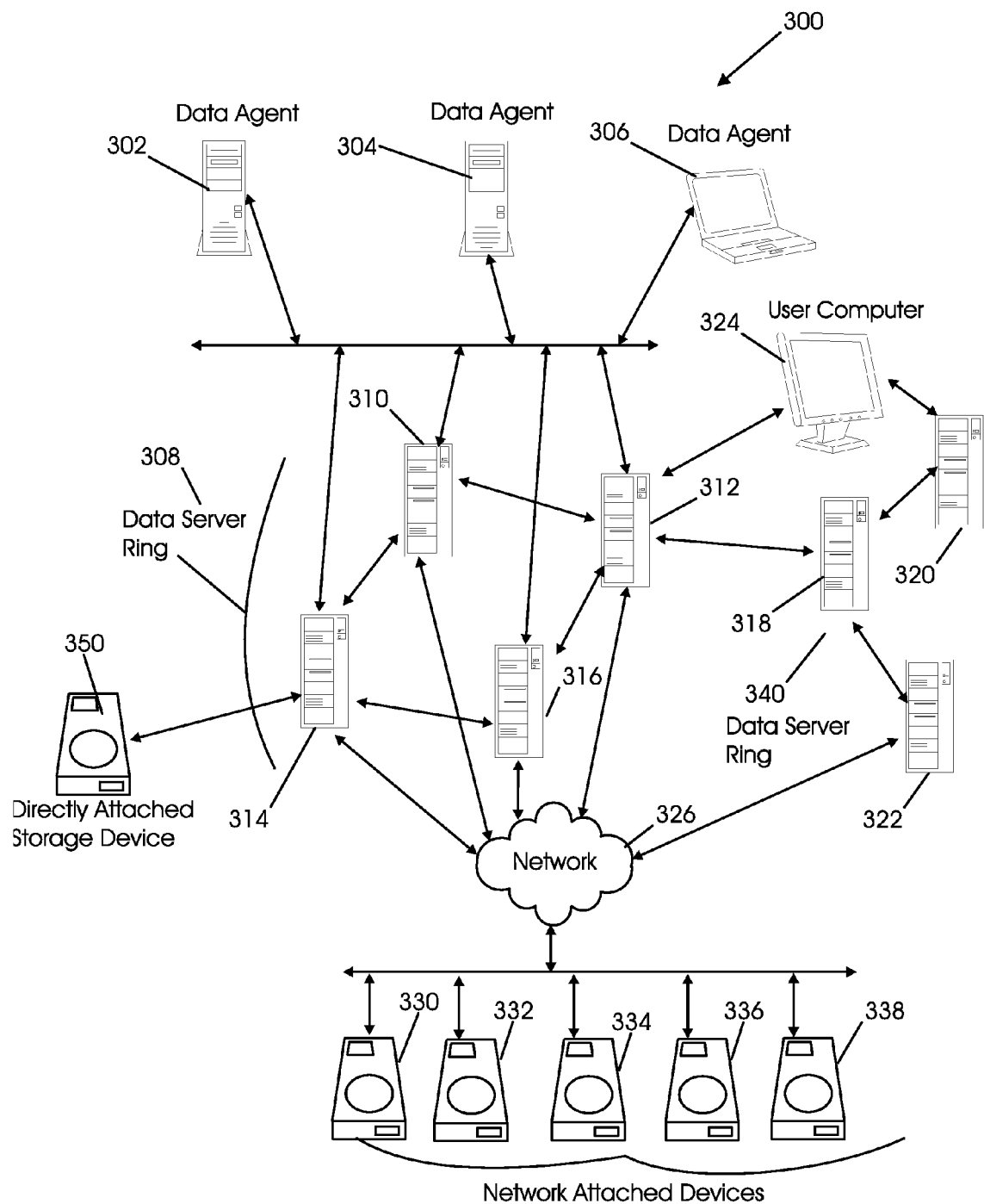
FIG. 3 shows a diagram of another apparatus for use in accordance with another embodiment of the present invention.

FIG. 3 shows a diagram of an apparatus 300 for use in accordance with another embodiment of the present invention. The apparatus 300 includes data agents 302, 304, and 306, a data server ring or group 308, a user computer 324, supplemental data servers 318, 320, and 322. The data servers 318, 320, and 322 are a part of a data server ring or group 340. The FIG. 3 embodiment illustrates that a first data server ring, such as 308 can be connected to a second data server ring, such as 340. The apparatus 300 also includes directly attached storage devices 350 and 322, network 326, and network attached devices 330, 332, 334, 336, and 338.

The data server ring 308 may be comprised of a plurality of data servers, such as data servers 310, 312, 314, and 316, and any number of further data servers. Each of data servers 310, 312, 314, and 316 in data server ring 308 can also have one or more directly attached storage devices, such as a computer memory disk, or tape. For example data server 314 is shown directly attached to directly attached storage device 350. Each of data servers 310, 312, 314, and 316 may also have access to network storage devices, such as 330, 332, 334, 336, and 338 through network 326.

Each of the data agents 302, 304, and 306, and each of the data servers of the data server ring 308, may include a computer having a computer memory, one or more computer processors, a computer monitor, and an interactive device such as a computer mouse and/or computer keyboard. The computer monitor or user computer 324 may also include a computer having a computer memory, a computer processor, a computer monitor, and an interactive device such as a computer mouse and/or computer keyboard.

In operation, referring to the apparatus and/or system 300 of FIG. 3, a backup/restore task process run by a computer software program on a data agent (such as one of data agents 302, 304, and 306) starts on a particular data agent. A data agent (for example 302) first retrieves data indicating which of data servers 310, 312, 314, and 316 in the connected ring 308 are available. A data agent (such as 302) next chooses one or more data servers (of 310, 312, 314, and 316) for the task based on data loads on each data server (of 310, 312, 314, and 316). The backup/restore task process then transmits data objects to chosen data servers (such as one or more of servers 310, 312, 314, and 316) and the chosen data servers store to a storage device (such a directly attached storage device, such as 350, or a network attached device, such as one or more of 330, 332, 334, 336, and 338).

If one data server (of 310, 312, 314, and 316) is taken offline via detachment or disconnection, in distributed mode, its meta data will be lost from the ring 308 (since it is only accessible by the particular data server which has been detached. Each data server (of 310, 312, 314, and 316) may send out a sync message to each of the other data servers, and received a sync message from each of the other data servers as previously described for the FIG. 2 embodiment. If a data server does not receive a return sync message from a particular data server, then the sending data server assumes that the receiving data server is down. If a particular data server detects that another data server is gone (i.e. down or detached), the transmitting data server will set a flag in the computer memory of the transmitting data server that the particular receiving data server is offline/detached so that a data agent (of data agents 302, 304, and 306) will not transmit data to the offline/detached data server (of data servers 310, 312, 314, and 316).

If a user, such as by use of a GUI running on user computer 324, such as a GUI which includes and/or produces screen or image 500 shown in FIG. 5, attaches the previously offline/detached data server via GUI, the data server is put back into the ring 308. When a data server (such as one of 310, 312, 314, and 316) is put back into the ring, the meta data for the server becomes online again, i.e. the meta data of the previously down data server will be available by a sync signal or message to other data servers in the ring 308. Meta data for a particular data server (such as one of 310, 312, 314, and 316) may be stored in any computer memory or computer storage device which is accessible to the particular data server. The meta data may be stored using or in a database system mentioned, such as previously mentioned, such as a database computer software systems such as sql server (trademarked), oracle (trademarked), etc. The database system is typically used to stored the meta data.

One data server ring, such as 308 can transmit ring 308 configuration data to a second data server ring, such as 340, so a user can use a GUI computer program running on the user computer 324 to view configuration data for the second data server ring 340. The user can use the GUI one the user computer 324 to manage all aspects for the ring 308 or a second ring 340, and the user can switch to the second ring 340, also. The GUI (graphical user interface), such as including the screen 500 shown in FIG. 5 can be used to switch to connect to a data server in a second ring, such as 340, and to manage the second ring 340 just like it does for the first one 308. Before the main user interface is displayed on a computer monitor of a user computer such as user computer 324, in one embodiment, there will be a login window, such as shown in FIG. 6, where a user can type in a username and password, plus which data server to connect to.

Figure 6:
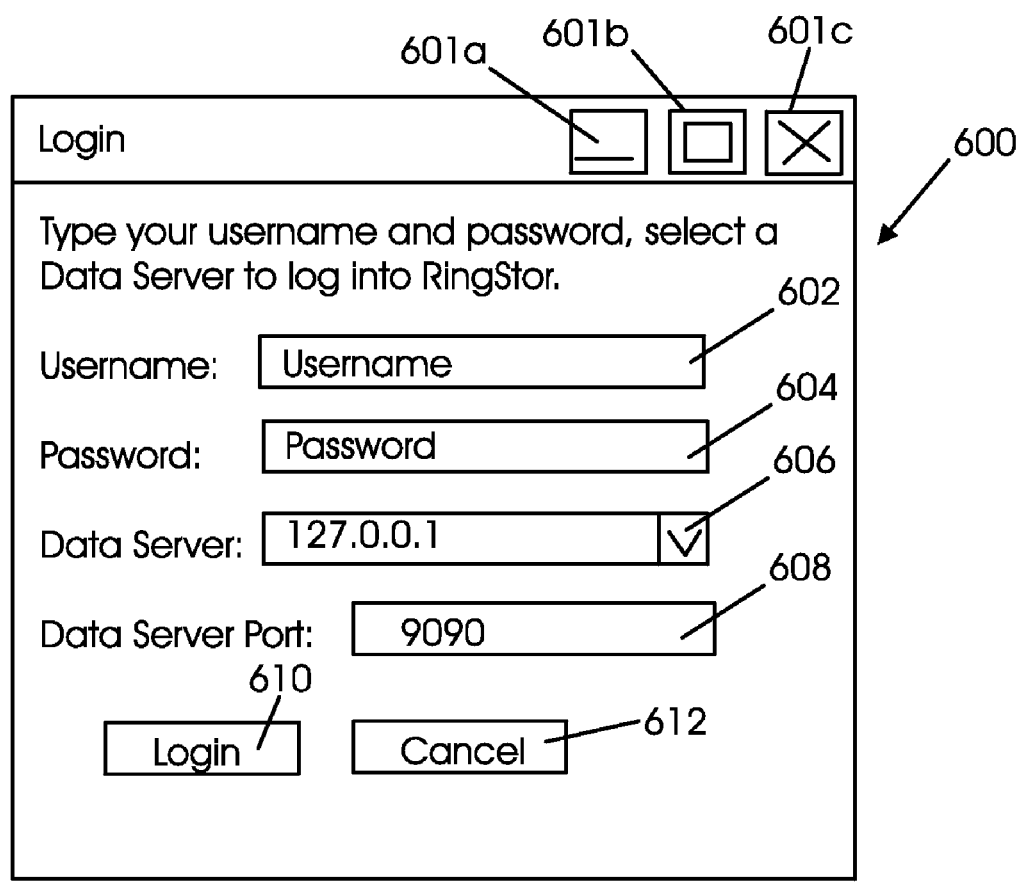
FIG. 6 shows a diagram of another screen shot or image which can be displayed on a computer monitor of a user computer of the apparatus of FIG. 3, in accordance with an embodiment of the present invention.

FIG. 6 shows an image or window 600 which can be displayed on a computer monitor of user computer 324. The image or window 600 includes fields 601a-c for minimizing, enlarging, and closing the window. The window 600 also includes entry fields or boxes 602, 604, 606, and 608, and buttons or fields 610 and 612. A user can enter his/her user name into field 602 and his/her password into fields 604. A user can also enter a code number or identification number for a data server, such as 127.0.0.1, which may identify a data server, such as one of data servers 210, 212, 214, and 216 of FIG. 2. The user can also enter a data server port identification, in this case port 9090 in field 608. The user can then login to the identified data server (in this case 127.0.0.1, with port 9090), which connects a user computer, such as user computer 218 or 324 with the particular data server (127.0.0.1) and then the user computer (218 or 324) will then be able to access all data servers in the ring that data server belongs to. For example, if code 127.0.0.1 refers to data server 210, then the user computer 218 will be able to access data servers 210, 212, 214, and 216 in ring 208 (as well as other devices, such as network attached storages devices 224, 226, and 228 connected to the ring 208.

The data server selected (by entry into field 606) will point to the ring the user interface connects to since a data server will be inside one ring. So for the example of the FIG. 3 embodiment, if a user pick data server 312 to connect with by use of image 600 of a user interface computer program running on the user computer 324, the user will manage ring 308. If the user picks data server 320 to open the user interface on user computer 324, the user manages the data server ring 340.

Figure 4:
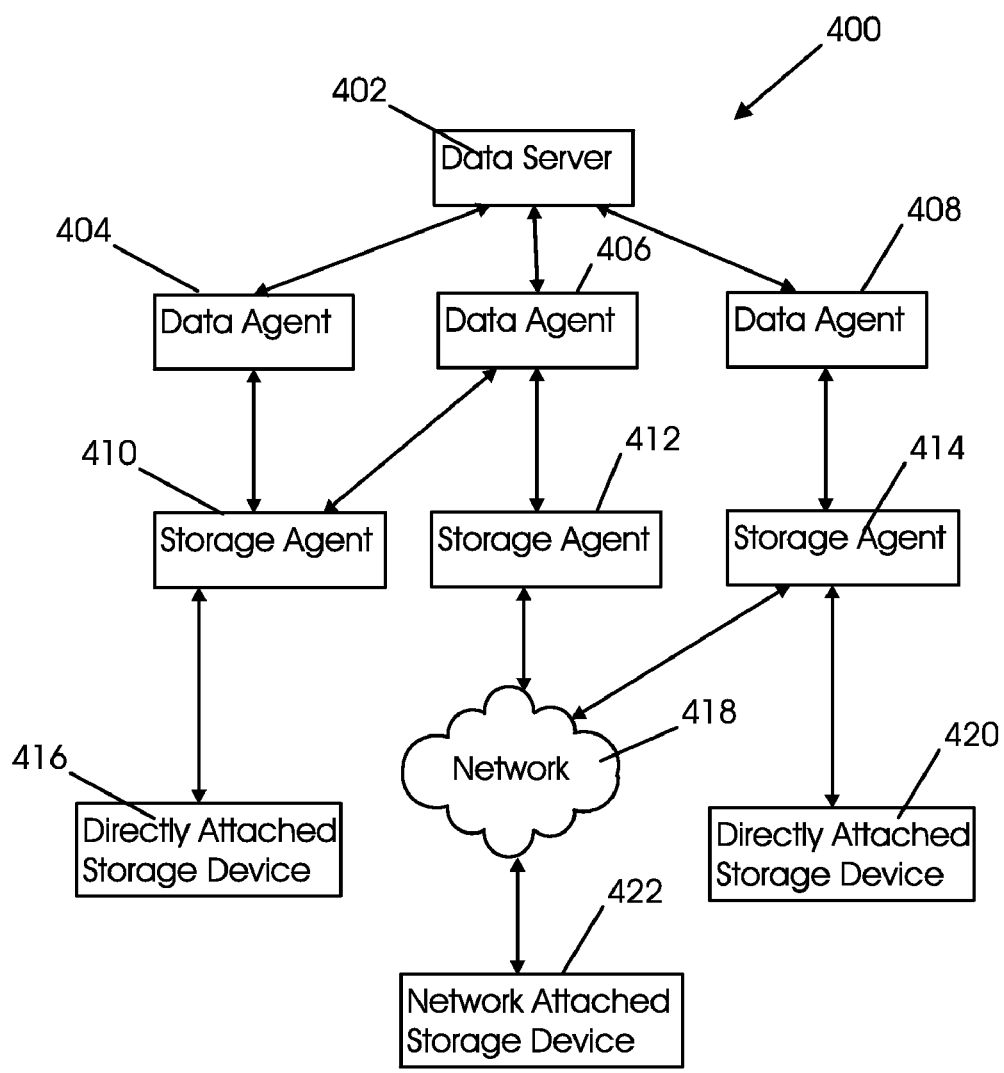
FIG. 4 shows a diagram of another prior art apparatus.

FIG. 4 shows diagram of a prior art apparatus 400. The prior art apparatus 400 includes a data server 402, data agents 404, 406, and 408, storage agents 410, 412, and 414, directly attached storage devices 416 and 420, network 418, and network attached storage device 422. The data server 402 is configured to communicate with the data agents 404, 406, and 408 via communications links. The data agents 404, 406, and 408 are configured to communicate with the storage agents 410, 412, and 414, respectively via communications links. The data agent 406 is also configured to communicate with the storage agent 410 via a communications link. The storage agents 410, 412, and 414 are configured to communicate with the direct attached storage device 416, network 418, and direct attached storage device 420, respectively. The storage agent 414 is also configured to communicate with network 418. The network 418 is configured to communicate with the network attached storage device 422.

In the FIG. 4 prior art embodiment, the data agents 404, 406, and 408 are managed by one central server, data server 402. In addition data agents 404, 406, and 408 back up their data to several storage agents (410, 412, and 414) which connect to various computer storage devices (416, 422, and 420) which may include disks, tapes, or other computer memory storage devices. The FIG. 4 prior art embodiment has various disadvantages including that it has one central server (data server 402) which has meta data or system configuration data, and which facilitates all commands. The data server 402 uses the metal data and system configuration data to run a backup system for the apparatus 400. If the one central server (data server 402) is down, the backup system will not function.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. An apparatus comprising:
a data agent computer; and
a data server computer group comprising
a first data server computer; and
a second data server computer;
wherein the first data server computer and the second data server computer are connected by a communications link;
wherein the data agent computer is programmed to choose one or more of the first data server computer and the second data server computer for a task based on a first data load on the first data server computer and a second data load on the second data server computer, and
wherein the task is a backup of data function and wherein when the first data load on the first data server computer and the second data load on the second data server computer both satisfy a criteria, the data agent computer is programmed to transmit data in one backup task to the first data server computer and to the second data server computer.

2. The apparatus of claim 1 wherein
the first data load on the first data server computer is defined by an amount of data currently coming into the first data server computer and the size of data transferred to the first data server computer per unit of time;
and the second data load on the second data server computer is defined by an amount of data currently coming into the second data server computer and the size of data transferred to the second data server computer per unit of time.

3. The apparatus of claim 1 wherein
the data agent computer includes a computer monitor;
wherein the data agent computer is programmed by a graphical user interface computer program to display a graphical user interface on the computer monitor;
wherein the graphical user interface computer program by use of the graphical user interface controls the data server computer group; and
wherein the graphical user interface includes a first field which when selected displays an identification for the first data server computer and an identification for the second data server computer.

4. The apparatus of claim 3 wherein
the graphical user interface includes a second field which when selected, causes, at least in part, the graphical user interface computer program to display an indication of one or more data agent computers that are configured to use the first data server computer for performing a task.

5. The apparatus of claim 3 wherein
the graphical user interface includes a second field adapted for receiving a user entry of an identification of the first data server computer;

wherein the user computer is programmed to enable the user to login to the first data server computer based at least in part on the user entry of the identification of the first data server computer;

and wherein the user computer is programmed to enable the user to access the second data server computer after the user has logged into the first data server computer.

6. The apparatus of claim 3 wherein the graphical user interface is configured to be used to cause a third data server computer to become part of the data server computer group.

7. The apparatus of claim 3 wherein the graphical user interface computer program is programmed to cause the second data server computer to become detached from the data server computer group, in response, at least in part to a user input into the graphical user interface, so that when detached, the second data server computer is no longer a part of the data server computer group.

8. The apparatus of claim 3 wherein the graphical user interface computer program is programmed to cause scheduling of a task to run on the first data server computer, in response, at least in part to a user selection of a second field of the graphical user interface.

9. The apparatus of claim 3 wherein the graphical user interface computer program is programmed to cause a list of running tasks for the data server computer group to be displayed on the computer monitor of the user computer, in response, at least in part, to a user selection of a second field of the graphical user interface.

10. The apparatus of claim 1 wherein when the first data load on the first data server computer and the second data load on the second data server computer both satisfy a criteria, the data agent computer is programmed to transmit data in one backup task to the first server computer and to the second server computer simultaneously.

11. The apparatus of claim 1 wherein the first data server computer is programmed to set an indication that the second data server computer is down when the first data server computer does not receive a sync up message from the second data server computer.

12. The apparatus of claim 11 wherein the indication is an update to metadata located in computer memory of the first data server computer to indicate that the second data server computer is down.

13. A method comprising the steps of configuring a first data server computer and a second data server computer in a data server group;

wherein the step of configuring includes connecting the first data server computer and the second data server computer by a communications link;

using a data agent computer to choose one or more of the first data server computer and the second data server computer for a task based on a first data load on the first data server computer and a second data load on the second data server computer; and wherein the task is a backup of data function and wherein when the first data load on the first data server computer and the second data load on the second data server computer both satisfy a criteria, the data agent computer is programmed to transmit data in one backup task to the first data server computer and to the second data server computer.

14. The method of claim 13 wherein when the first data load on the first data server computer and the second data load on the second data server computer both satisfy the criteria, the data agent computer is programmed to transmit data in one backup task to the first data server computer and to the second data server computer simultaneously.

15. The method of claim 13 wherein the first data load on the first data server computer is defined by an amount of data currently coming into the first data server computer and the size of data transferred to the first data server computer per unit of time;

and the second data load on the second data server computer is defined by an amount of data coming into the second data server computer and the size of data transferred to the second data server computer per unit of time.

* * * * *